(12) United States Patent
Choi

(10) Patent No.: US 7,336,974 B2
(45) Date of Patent: Feb. 26, 2008

(54) SYSTEM AND METHOD FOR PIN BLOCKING ON TERMINAL FOR MOBILE FINANCE

(75) Inventor: Hyun-il Choi, Seoul (KR)

(73) Assignee: KEYZAP Inc., Victoria (CA)

( * ) Notice: Subject to any disclaimer, the term of this patent is extended or adjusted under 35 U.S.C. 154(b) by 515 days.

(21) Appl. No.: 11/013,300

(22) Filed: Dec. 15, 2004

(65) Prior Publication Data

US 2005/0153742 A1    Jul. 14, 2005

(30) Foreign Application Priority Data

Dec. 18, 2003   (KR) ................. 10-2003-0093305

(51) Int. Cl.
*H04B 1/38* (2006.01)

(52) U.S. Cl. .................. 455/558; 455/411; 455/410

(58) Field of Classification Search ............... 455/558, 455/411, 410, 412.1, 412.2, 414.1, 415, 419, 455/420, 417, 186.1; 370/287
See application file for complete search history.

(56) References Cited

U.S. PATENT DOCUMENTS

| | | | | |
|---|---|---|---|---|
| 5,907,804 A | * | 5/1999 | Schroderus et al. | ........ 455/411 |
| 6,360,092 B1 | * | 3/2002 | Carrara | ........ 455/410 |
| 2003/0017836 A1 | * | 1/2003 | Vishwanathan et al. | .... 455/517 |
| 2004/0235455 A1 | * | 11/2004 | Jiang | .......... 455/411 |
| 2004/0266415 A1 | * | 12/2004 | Belkin et al. | ........ 455/415 |

* cited by examiner

*Primary Examiner*—Tan Trinh
(74) *Attorney, Agent, or Firm*—Christensen O'Connor Johnson Kindness PLLC

(57) ABSTRACT

A system and a method for PIN blocking on a terminal for mobile finance in accordance with the present invention can remotely block a smart chip within a mobile communication terminal, when a customer loses the terminal for using a mobile financial service. This prevents a finder or a third party from obtaining information stored in the smart chip or accessing the mobile financial service as the owner of the terminal. As a result, it can remarkably increase security for customer information and financial transactions.

12 Claims, 5 Drawing Sheets

SYSTEM AND METHOD FOR PIN BLOCKING ON TERMINAL FOR MOBILE FINANCE

BACKGROUND OF THE INVENTION

The present invention generally relates to a system and a method for PIN blocking on a terminal for mobile finance, and more specifically, to a system and a method for PIN blocking on a terminal for mobile finance to block a smart chip not to use a mobile finance service with a mobile communication terminal by transmitting an SMS (Short Message Service) message to the mobile communication terminal, when a user lost the mobile communication terminal in which the smart chip for using the mobile finance service such as mobile banking, stock exchange and/or insurance is contained.

As the Internet and terminal technologies are developed, most finance services such as banking, stock exchange, and insurance which have been provided through telephones or offline are now supplied online and in real time over the Internet. Also, such online transactions are gradually increasing.

Users can use the online finance services at home or in workplace where the user can access the Internet without using a specific terminal (in case of banking, ATM) or without a customer directly visiting financial institutions such as banks, security corporations or insurance companies. Particularly, in case of the Internet banking, the user can freely use it at any time, any place. In addition, an online financial service, especially, the Internet banking service has been rapidly popularized thanks to low service charges caused by reduction in manpower and cost of financial institutions. Meanwhile, the online financial service system should be connected to a wired line such as the high speed cable Internet (ADSL, VDSL) or a wireless line (ex, Nespot) to access the Internet. However, when the wired line is used, the online financial service is restricted on a specific place like home or workplace, causing mobility problem. The wireless line also has a problem of mobility since an accessible area is limited in zone type.

In the meantime, backed up by the development of portable phone technology, the speed of wireless Internet technology, and security aspects, a mobile financial technology which can use such an online financial service through a mobile communication terminal including a portable phone has been suggested, and now it is being rapidly developed. The above mobile financial service can be used through a system of a mobile communication company and a wireless Internet network after an application for using mobile finance and a smart chip having a customer ID (banking ID) are mounted on a mobile communication terminal (dedicated terminal).

Nevertheless, in case the customer lost the mobile communication terminal, the customer cannot use the mobile finance. To make matters worse, not only does the important information including the customer ID recorded on the smart chip leak out, but also the finder may access the customer's account by using the mobile communication terminal. Thus, a system and a method for PIN blocking are highly required to prevent the smart chip from being obtained or used by others when the customer lost the mobile communication terminal.

SUMMARY OF THE INVENTION

It is therefore an object of the present invention to provide a system for PIN blocking on a terminal for mobile finance. Moreover, it is another object of the present invention to provide a method for PIN blocking on a terminal for mobile finance.

That is, the present invention suggests a system and a method for PIN blocking on a terminal for mobile finance to remarkably improve transactional safety of a mobile financial service by preventing a finder from obtaining information recorded on a smart chip or accessing a customer's account with a mobile communication terminal, since the built-in smart chip can be blocked by transmitting an SMS message to the mobile communication terminal when the customer of the mobile financial service has lost the terminal for using the mobile financial service.

BRIEF DESCRIPTION OF THE DRAWINGS

The invention, together with further aspects and advantages thereof, may best be understood by reference to the following description taken in conjunction with the accompanying drawings in which.

DETAILED DESCRIPTION OF THE PREFERRED EMBODIMENT

Figure 1:
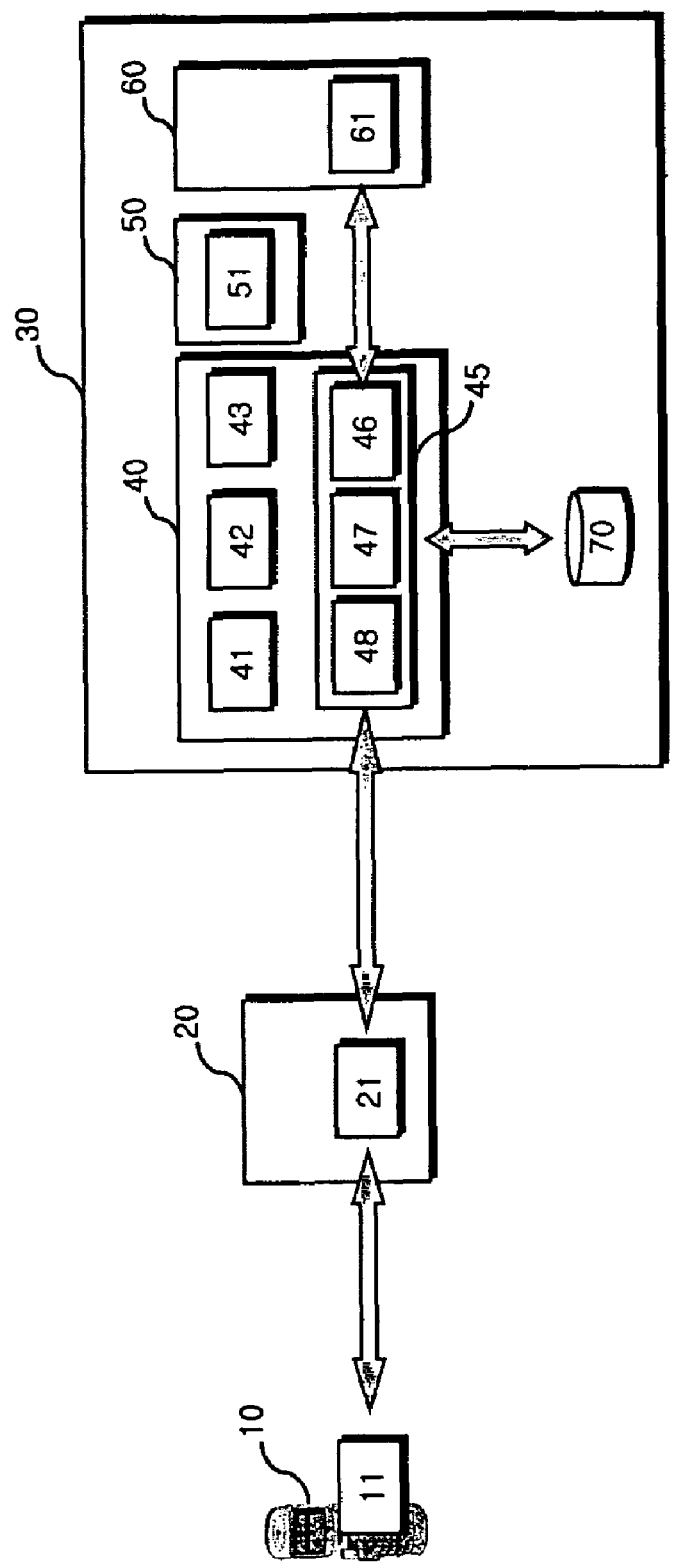
FIG. 1 is a format diagram of a system for PIN blocking on a terminal for mobile banking in accordance with the present invention.

To achieve the above object, a mobile financial system for providing a mobile financial service including banking, securities and/or insurance to a customer by using a mobile communication terminal where a smart chip is contained, and for PIN blocking on the smart chip through a mobile communication company system when the mobile communication terminal is lost, comprising: a first communication unit including a number of the mobile communication terminal and a hexa value, and receiving a PIN block telegram for requesting a PIN block; a logic processor consisting of a first processing module for parsing the PIN block telegram, generating an identifiable number, and storing the number, the mobile communication terminal number, and the hexa value in a predetermined first storage, and a second processing module for combining the number, the mobile communication terminal number, and the hexa value stored in the first storage, and generating an SMS telegram to request a PIN block SMS to be transmitted; and an SMS processor including a second communication unit for transmitting the generated SMS telegram to a mobile communication company system. The hexa value includes a chip serial number, the number of the smart chip, and predetermined encoded data.

Desirably, the mobile financial system further comprises a relay server which transmits the PIN block telegram to the first communication unit, and at this time, the first storage further stores a transceiving log of the PIN block telegram between the relay server and the first communication unit.

Besides, the second communication unit receives a first ACK signal transmitted as a response to the SMS telegram from the mobile communication company system, and having an ID value for showing that the SMS telegram is received in the mobile communication company system, and report data having an ID value for showing a result of the PIN block SMS to the mobile communication terminal by the SMS telegram. The second communication unit transmits a second ACK signal to the mobile communication company system as a response to the report data. On this occasion, the SMS telegram and the first ACK signal, and the report data and the second ACK signal are transceived through the same port.

Desirably, the mobile financial system further comprises a second storage transmitting a general SMS to deliver an announcement and notice to the mobile communication terminal through the mobile communication company system, and storing priorities for showing priorities between general SMS transmission and PIN block SMS transmission and a text for showing contents of the general SMS.

Likewise, to accomplish another object of the present invention, a method for PIN blocking on a terminal for mobile finance to PIN-block a smart chip by providing a mobile financial service including banking, securities and/or insurance to a customer with a mobile communication terminal where the smart chip is contained, and by transmitting a PIN block SMS for blocking the smart chip to the mobile communication terminal through a mobile communication company system, comprising the steps of: a first step of including a number of the mobile communication terminal and a hexa value, and receiving a PIN block telegram for requesting a PIN block of the smart chip; a second step of generating a predetermined identifiable number, combining the number, the mobile communication terminal number, and the hexa value, and generating an SMS telegram for requesting a PIN block SMS to be transmitted to the mobile communication terminal; and a third step of transmitting the generated SMS telegram to the mobile communication company system. The hexa value includes a chip serial number, a number of the smart chip, and predetermined encoded data.

Desirably, prior to at least the third step, the method further comprises: a fourth step of generating a socket to transceive data with the mobile communication company system; a fifth step of transmitting a bind signal for requesting a communication connection to the mobile communication company system; and a sixth step of receiving a first ACK signal as a response to the bind signal from the mobile communication company system.

Moreover, after the third step, the method further comprises: a 3-1 step of receiving the second ACK signal transmitted as the response to the SMS telegram from the mobile communication company system, and having the ID value for showing that the SMS telegram is received in the mobile communication company system; and a 3-2 step of updating the second ACK signal received in the storage where a predetermined initial value for the second ACK signal is stored. At this moment, the storage stores the ID number, the mobile communication terminal number, the hexa value, and the second ACK signal by customer who lost the mobile communication terminal. And, the second step further consists of: a 2-1 step of the storage retrieving customer data where the initial value is stored as the second ACK signal; and a 2-2 step of loading the retrieved data, combining the ID number, the mobile communication terminal number, and the hexa value, and generating the SMS telegram.

Desirably, after the third step, the method further comprises: a 3-3 step of receiving the report data having the ID value for showing a result of the PIN block SMS transmitted to the mobile communication terminal by the SMS telegram from the mobile communication company system; a 3-4 step of storing the report data in the predetermined storage; and a 3-5 step of transmitting a third ACK signal to the mobile communication company system as a response to the report data.

The present invention will now be described in detail with reference to exemplary preferred embodiments as illustrated in the accompanying drawings. Then, a mobile banking service, which is popularized the most, will be described in priority among mobile financial services.

FIG. 1 is a format diagram of a system for PIN blocking on a terminal for mobile finance in accordance with the present invention, illustrating a system configuration for mobile banking of mobile services. Like shown in FIG. 1, the configuration of the system for PIN blocking on the terminal for mobile finance is composed of a mobile communication terminal (10) possessed by a customer, and being mounted with a smart chip (11) where a customer ID (banking ID) is recorded to use the mobile banking service; a mobile communication company system (20) mediating data transceiving between the customer's mobile communication terminal (10) and a mobile banking system (30) of a financial institution; and the mobile banking system (30) providing the mobile banking service to the customer. In the system for PIN blocking in accordance with the present invention, when a loss report on the customer's mobile communication terminal (10) is received, a telegram (hereinafter, called 'SMS telegram') for requesting the mobile communication company system to transmit an SMS (Short Message Service, hereinafter, called 'PIN block SMS') for blocking the smart chip (11) is transmitted to the mobile communication company system (20) from the mobile banking system (30). The mobile communication company system transmits the PIN block SMS to the mobile communication terminal according to the transmitted SMS telegram, blocking the smart chip not to be used. In this case, data transceiving for mobile banking between the mobile communication terminal (10) and the mobile communication company system (20) is performed via a wireless Internet network (not shown). And, the PIN block SMS or an SMS for other announcements is transceived through a mobile communication phone network having a base station as an intermediary. Also, data is transceived between the mobile communication company system and the mobile banking system via a dedicated line (not shown).

FIG. 1 concentrically illustrates components used for PIN blocking in the system for providing the mobile banking service, and general components for the rest mobile banking services can be easily understood by common experts in the art (hereinafter, called 'those skilled in the art'), thus detailed explanations will be omitted. Besides, since a system configuration for other mobile financial service except the mobile banking service is also similar to the mobile banking system, the present invention can be applied to the other mobile financial service through modifications of a business logic processor (42) and an Internet banking server (50) of a mobile server (40) shown in FIG. 1. Therefore, those skilled in the art may apply the system for PIN blocking to other mobile financial system through the accompanying drawings and descriptions below.

The mobile communication terminal (10) in accordance with the present invention is possessed by a customer for using the mobile banking service, and a portable phone or a PDA terminal accessible to a wireless Internet network can be used. In addition, the smart chip (11) is mounted on the mobile communication terminal (10), and an ID for identifying the corresponding customer while using the mobile banking service, that is, a banking ID is recorded on the smart chip. The smart chip (11) provides the mobile banking service by interworking with another application mounted on the mobile communication terminal (10) for mobile banking.

Meanwhile, the mobile communication terminal (10) receives an SMS (general SMS for delivering information such as an announcement during the mobile banking) from the mobile communication company system (20), and displays the received SMS. Particularly, when the PIN block SMS is received, the smart chip (11) is blocked not to be used. So, it is desirable not to produce an alarm such as an alarming sound or to display the received PIN block SMS on a screen. In other words, unlike a general SMS message, the PIN block SMS is a kind of a command transmitted from the mobile communication company system (20). At the same time, a blocking process of the smart chip performed by the received PIN block SMS can be carried out through a circuit configuration within the smart card or another application for executing a PIN block function by receiving a code of the SMS as a command. Likewise, not only is it desirable that the smart chip (11) is blocked not to use the mobile banking service through the blocked smart chip, but an access itself is disabled not to read information recorded on the smart card, thereby improving security by making the blocked smart chip (11) unrestorable later.

The mobile communication company system (20) in accordance with the present invention is used to provide the mobile banking service with a mobile communication service to the mobile communication terminal (10), directly mediating data transceiving between the mobile communication terminal (10) and the mobile banking system (30), that is, the mobile banking service of the customer. Also, when the SMS telegram for requesting the PIN block SMS to be transmitted to the lost mobile communication terminal from the mobile banking system (30) is received, the mobile communication company system (20) specifies the mobile communication terminal according to the received telegram, and generates/transmits the PIN block SMS. Such a series of processes are performed by an SMS server processor (21).

The mobile banking system (30) in accordance with the present invention provides the mobile banking service to the customer, and generates/transmits the SMS telegram requesting the PIN block SMS to be transmitted to the mobile communication company system (20) when a loss report on the mobile communication terminal (10) is received from the customer. The mobile banking system (30) includes an SMS database (70) for storing data necessary for processing the SMS telegram for the PIN block, as well as the mobile server (40), the Internet banking server (50), and a relay server (60). On the other hand, the mobile banking system (30) comprises another database for storing information (customer information, transaction details, etc.) to provide the mobile banking service, but the database is not illustrated since it is not intended in the present invention.

The mobile server (40) in accordance with the present invention provides the mobile banking service by interworking with the Internet banking server (50), and generates/transmits the SMS telegram to the mobile communication company system (20). The mobile server (40) is used to process the mobile banking service, and consists of a mediating portion (41) for mediating service request data and telegram result data from the mobile communication terminal (10), the business logic processor (42) performing a telegram processing work in accordance with the service request data, and a CORBA client processor (43) for data communication with the Internet banking server (50).

Besides, the mobile server (40) comprises an SMS processor (45) for PIN block processing of the lost mobile communication terminal (10). The SMS processor is composed of a first communication unit (46) for receiving a telegram (hereinafter, called 'PIN block telegram') to request the PIN block and receive a loss report on the mobile communication terminal from the relay server (60), a logic processor (47) for generating an ID number according to the received PIN block telegram to store the number in the SMS database (70) and for generating the SMS telegram to be transmitted to the mobile communication company system (20), and a second communication unit (48) for transmitting the generated SMS telegram to the mobile communication company system. The logic processor (47) consists of a first processing module for parsing the PIN block telegram received from the relay server (60) while generating an ID number and storing the generated ID number and the mobile communication terminal number in an SMS database, and a second processing module for combining information stored in the SMS database and generating the SMS telegram to be transmitted to the mobile communication company system. The first processing module is shared by the first communication unit (46), whereas the second processing module is shared by the second communication unit (48).

The Internet banking server (50) is used to provide the Internet banking service, supplying the mobile banking service by interworking with the mobile server (40). The Internet banking server (50) comprises a CORBA server processor (51). The CORBA server processor (51) supplies communication between the mobile server (40) and the Internet banking server by interworking with the CORBA client processor (43).

The relay server (60) receives lost details on the customer's mobile communication terminal (10) from a host (not shown) of a financial institution, generates a PIN block telegram for requesting a PIN block of the smart chip (11), and transmits the PIN block telegram to the first communication unit (46) of the SMS processor (45). Such a series of processes are performed by an SMS client processor (61).

The SMS database (70) in accordance with the present invention stores data necessary for processing the SMS telegram with regards to the PIN block, and comprises a PIN block log table for storing data extracted from the PIN block telegram received from the relay server (60) and being used to generate the SMS telegram, and an SMS log table for storing a log in accordance with a transmission of the SMS telegram. The PIN block log table is stored with the ID number generated by the first processing module, mobile communication terminal information (serial number of the smart chip, the mobile communication terminal number, etc.) obtained from the PIN block telegram received from the relay server (60), and a telegram transaction log with the relay server. In addition, the SMS log table is stored with the ID number, the mobile communication terminal number, and SMS telegram transceiving details (DELIVER_ACK and REPORT, etc.) with the mobile communication company system (20). A table configuration on the SMS database will be more specifically described through explanations in FIG. 4.

Also, functions and operations of each component illustrated in FIG. 1 will be clearer by describing a PIN block process in FIG. 2 and FIG. 3 below.

Figure 2:
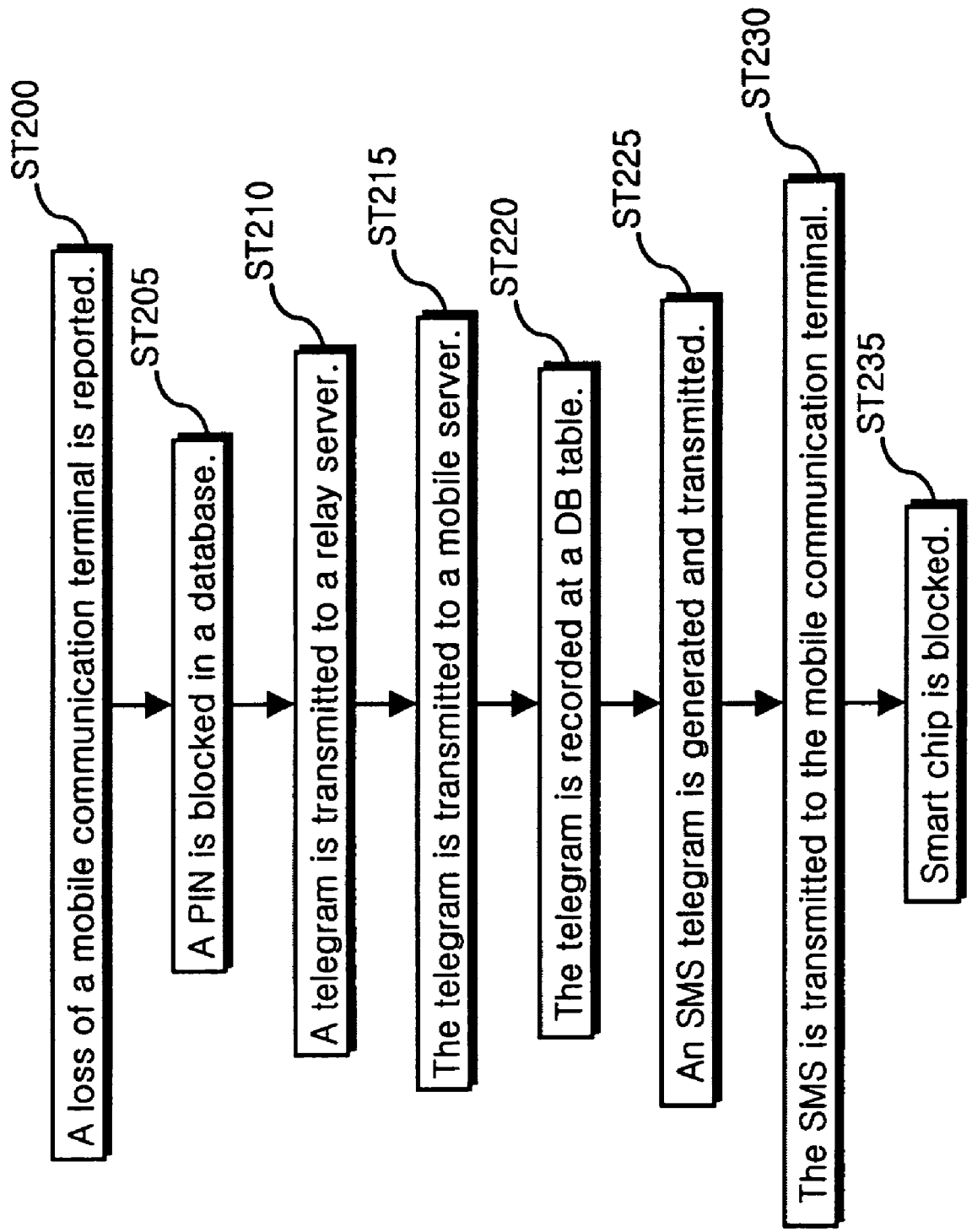
FIG. 2 is an entire flow chart showing a PIN blocking process of a mobile communication terminal.

FIG. 2 is an entire flow chart showing a PIN block process of a mobile communication terminal. Referring to FIG. 2, the PIN block process of the mobile communication terminal will be described as follows.

If a customer for using a mobile banking service lost the mobile communication terminal (10), the customer reports a loss of the terminal to the mobile banking system (30), and the mobile banking system blocks a serial number (PIN number) of the corresponding chip in a database (not shown) where information on the corresponding customer is recorded while the mobile banking service is provided (ST200, ST205). More specifically, it extracts the information on the corresponding customer through the customer's mobile communication number or a banking ID, and blocks the serial number of the smart chip (11) built in the lost mobile communication terminal (10). It is because to prevent a finder or a third party of the mobile communication terminal (10) from maliciously accessing a mobile banking service on behalf of the customer. From now on, it is possible to cut off the access to the mobile banking service through the mobile communication terminal where the corresponding smart chip (smart chip having a blocked PIN number) is mounted.

If loss information on the mobile communication terminal (10) is transmitted to the relay server (60) from the host of the financial institution, the relay server generates a PIN block telegram and transmits the text to the SMS processor (45) (ST210, ST215). The SMS processor (45) stores a log in accordance with the received PIN block telegram in the SMS database, generates an SMS telegram, and transmits the SMS telegram to the SMS server processor (21) of the mobile communication company system (20) (ST220, ST225).

The SMS server processor (21) fixes the mobile communication terminal (10) according to the received SMS telegram, generates/transmits the PIN block SMS, and blocks the smart chip (11) of the mobile communication terminal (ST230, ST235).

Figure 3A:
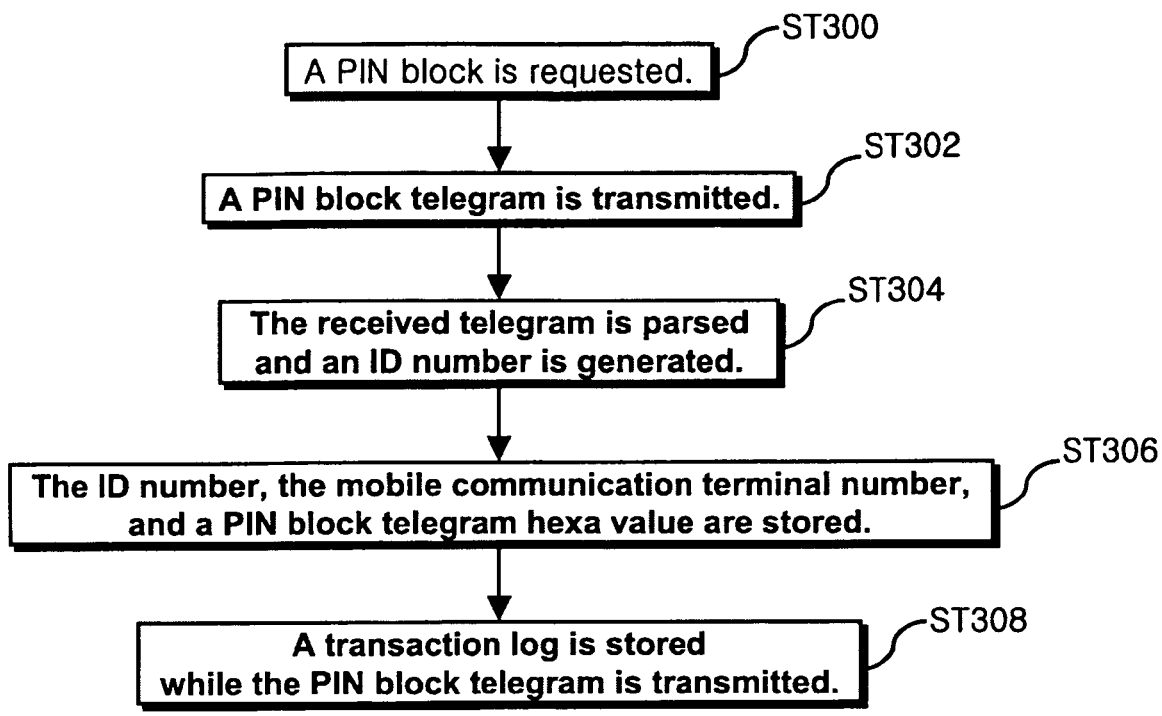
FIGS. 3a and 3b are a flow chart showing a PIN blocking process of an SMS processor.
Figure 3B:
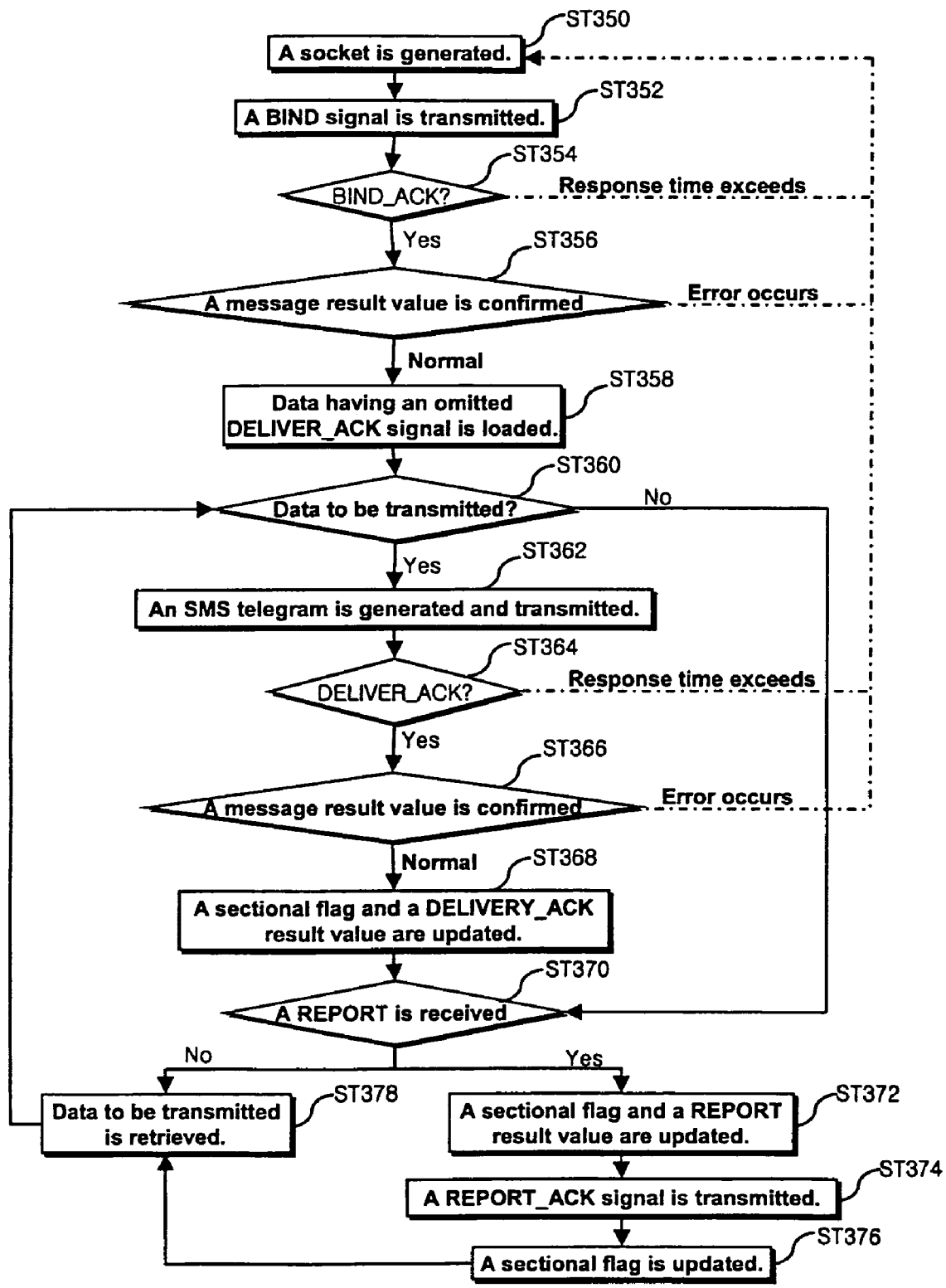

FIG. 3 is a flow chart for PIN block processing of an SMS processor. FIG. 3a is a diagram illustrating a process of receiving and processing a PIN block telegram from the relay server (60), and FIG. 3b is a diagram illustrating that an SMS telegram is generated and transmitted to the mobile communication company system (20). Referring to FIG. 3a and FIG. 3b, a PIN block process of the SMS processor (45) will be described as follows.

If a customer reports on a loss of the mobile communication terminal (10) to a financial institution, a host of the financial institution transmits a telegram for requesting a PIN block to the relay server (60), and the relay server retransmits the PIN block telegram to the SMS processor (45) (ST300, ST302). At this time, the PIN block telegram includes at least a mobile communication terminal number for identifying the lost mobile communication terminal and a hexa value. A serial number of the smart chip (11), a CRYPTO value, which is encoded data, and an MAC value for guaranteeing integrity of the CRYPTO value are included in the hexa value. Each of the values is distinguished into each field when being recorded in the hexa value, and desirably, certain positional numbers are located in each field.

The PIN block telegram is received by the first communication unit (46) of the SMS processor (45), and the first communication unit parses the PIN block telegram through the first processing module of the logic processor (47), and generates an ID number (ST304). Next, the first processing module stores the ID number, the mobile communication terminal number obtained from the PIN block telegram, and the hexa value of the PIN block telegram at the PIN block log table of the SMS database, and retransmits the received PIN block telegram to the relay server (ST306, ST308). In detail, the hexa value of the PIN block telegram is distinguished by certain positional number to extract chip serial numbers, CRYPTO values, and MAC values of each field, and the extracted values are stored in each field of the PIN block log table. On this occasion, the PIN block telegram retransmitted to the relay server (60) in the step 'ST308' functions as a kind of an ACK signal as a response to the PIN block telegram received in the step 'ST302'. The relay server (60) and the SMS processor (45) communicate with each other through the telegram, and the telegram should be processed as a response to a request all the time. Accordingly, if the SMS processor does not send a response to the request (PIN block telegram), the relay server retransmits the request for the telegram such that the PIN block telegram can be transmitted to the relay server (60), thereby transmitting the response to the request.

Meanwhile, the first processing module stores details about receiving and transmitting the PIN block telegram in a transaction log field of the PIN block log table.

Next, the SMS processor (45) should generate and transmit an SMS telegram for requesting a PIN block SMS to be transmitted to the mobile communication company system (20), according to the PIN block telegram received from the relay server (60).

First, the second communication unit (48) attempts a socket connection to transceive data with the mobile communication company system (20), and transmits a BIND signal to the SMS server processor (21) (ST350, ST352). If a BIND_ACK signal, a response to the BIND signal is received from the SMS server processor (21), the second communication unit (48) confirms a result value of the received BIND_ACK signal, and judges a connected state with the SMS server processor (21) (ST354, ST356). In the meantime, if a certain time (response time) elapses while the BIND_ACK signal is not received from the SMS server processor (21), that is, the BIND signal fails, a socket is regenerated to attempt transmitting the BIND signal. Moreover, even though the result value of the BIND_ACK signal shows a BIND failure caused by errors such as 'system failure', 'authentication failure or immediate disconnection', and 'message type error', the BIND generation and transmission is reattempted. So, if a BIND connection is executed between the second communication unit (48) and the SMS server processor (21) through the above process, the connected state is continuously maintained while data is mutually transceived. And, when the connection is cut off owing to a system failure, the BIND connection is reattempted.

If the BIND is successful in the step 'ST356', the second communication unit (48) retrieves a field having a transmission failure or which does not yet transmit data, that is, the SMS telegram to be delivered from the SMS log table of the SMS database (70) through the second processing module of the logic processor (47) (ST358).

To retrieve and extract the data in the step 'ST358', data where a DELIVER_ACK field is not updated should be searched. To do so, first, there is a method for retrieving data having a null DELIVER_ACK field. In this case, the DELIVER_ACK field is generated when the SMS log table is created, while initializing the field in null state, and when the DELIVER_ACK field is received, a receiving value is stored in the corresponding field. Therefore, data of the field having the null DELIVER_ACK field can be judged as data for an SMS telegram where the DELIVER_ACK field is not received yet. For another method, a specific value (ex, '0') is stored in the DELIVER_ACK field to initialize when the SMS table is created, and if the DELIVER_ACK field is received, the corresponding field is updated with a receiving value. So, it is available to retrieve data where the initial value '0' is recorded in the DELIVER_ACK field. Certainly, a method for retrieving and extracting data where a DELIVER_ACK value is omitted can be variable except the above two methods.

If data to be transmitted exists after the retrieving, the second processing module loads and combines necessary data to generate an SMS telegram. More specifically, it extracts an ID number from the data to be transmitted from the SMS log table of the SMS database (70), loads a mobile communication terminal number of the corresponding data and a hexa value (chip serial number, CRYPTO, MAC) from the PIN block log table by considering the ID number as a key, and combines the loaded number and the value. Once the SMS telegram is generated, the second communication unit (48) transmits the generated SMS telegram (DELIVER message) to the SMS server processor (21), and updates a sectional flag field value, which shows process situations, from the SMS log table of the SMS database (70) into '1'(ST360, ST362).

If the data to be transmitted does not exist in the step 'ST360', a result for the transmitted PIN block SMS to the mobile communication terminal (10) is received and processed with regards to a REPORT from the SMS server processor (21), that is, the previously transmitted SMS telegram. The receiving and processing of the REPORT will be more specifically described as follows.

If the SMS telegram transmitted in the step 'ST362' is received in the SMS server processor (21), the SMS server processor transmits a DELIVER_ACK signal as a response to the telegram, and the second communication unit (46) confirms a result value of the received DELIVER_ACK signal to verify a transmitted state of the SMS telegram (ST364, ST366).

If the DELIVER_ACK result value expresses 'transmission success', it means that the SMS telegram is normally transmitted. Thus, the second communication unit (48) updates the sectional flag field value of the SMS log table into '2' showing 'DELIVER_ACK', and updates a value of the DELIVER_ACK field into the received DELIVER_ACK result value (ST368). Furthermore, even though the DELIVER_ACK result value expresses 'message type error' or 'no receiving subscriber', it means that the SMS telegram is normally transmitted to the SMS server processor (21). So, the sectional flag field value and the DELIVER_ACK field value are updated.

On the contrary, if the DELIVER_ACK value is not received after a response time elapses or a receiving value shows 'system failure' or 'BIND disconnection', it means that a connection with the SMS server processor (21) is cut off. Therefore, the socket generation and the BIND transmission are reattempted (ST350, ST352).

The SMS server processor (21) generates the PIN block SMS according to the receive SMS telegram, and transmits the generated SMS to the corresponding mobile communication terminal (10), while transmitting a REPORT on a transmission result about the PIN block SMS to the second communication unit (48). At this point, result values for the REPORT include 'transmission success', 'not-registered, not in service or service is suspended', 'terminal is powered off', 'shade area', 'full terminal messages', and 'other errors', and each value is displayed as separate identifiable codes.

If the REPORT is received, the second communication unit (48) updates the sectional flag field value of the SMS log table into '3' showing a REPORT reception, and stores a REPORT result value received in a REPORT field to update the stored REPORT result value (ST370, ST372). The second communication unit (48) transmits a REPORT_ACK signal to the SMS server processor (21) as a response to the REPORT reception, and updates the sectional flag value of the SMS log table into '4' showing the REPORT_ACK signal (ST374, ST376).

Meanwhile, the second communication unit (48) retrieves data to be transmitted from the SMS log table of the SMS database (70) while the REPORT is not received, that is, data whose 'DELIVER_ACK' field is null or having a specific initial value, and generates/transmits the SMS telegram for the retrieved data (ST370, ST378).

The SMS telegram and the REPORT are not mutually transceived through separate ports, but the SMS telegram/DELIVER_ACK signal and the REPORT/REPORT_ACK signal are transceived through one port. However, unlike the above method, it is possible to transceive the SMS telegram/DELIVER_ACK signal and the REPORT/REPORT_ACK through separate ports by using two ports.

Figure 4:
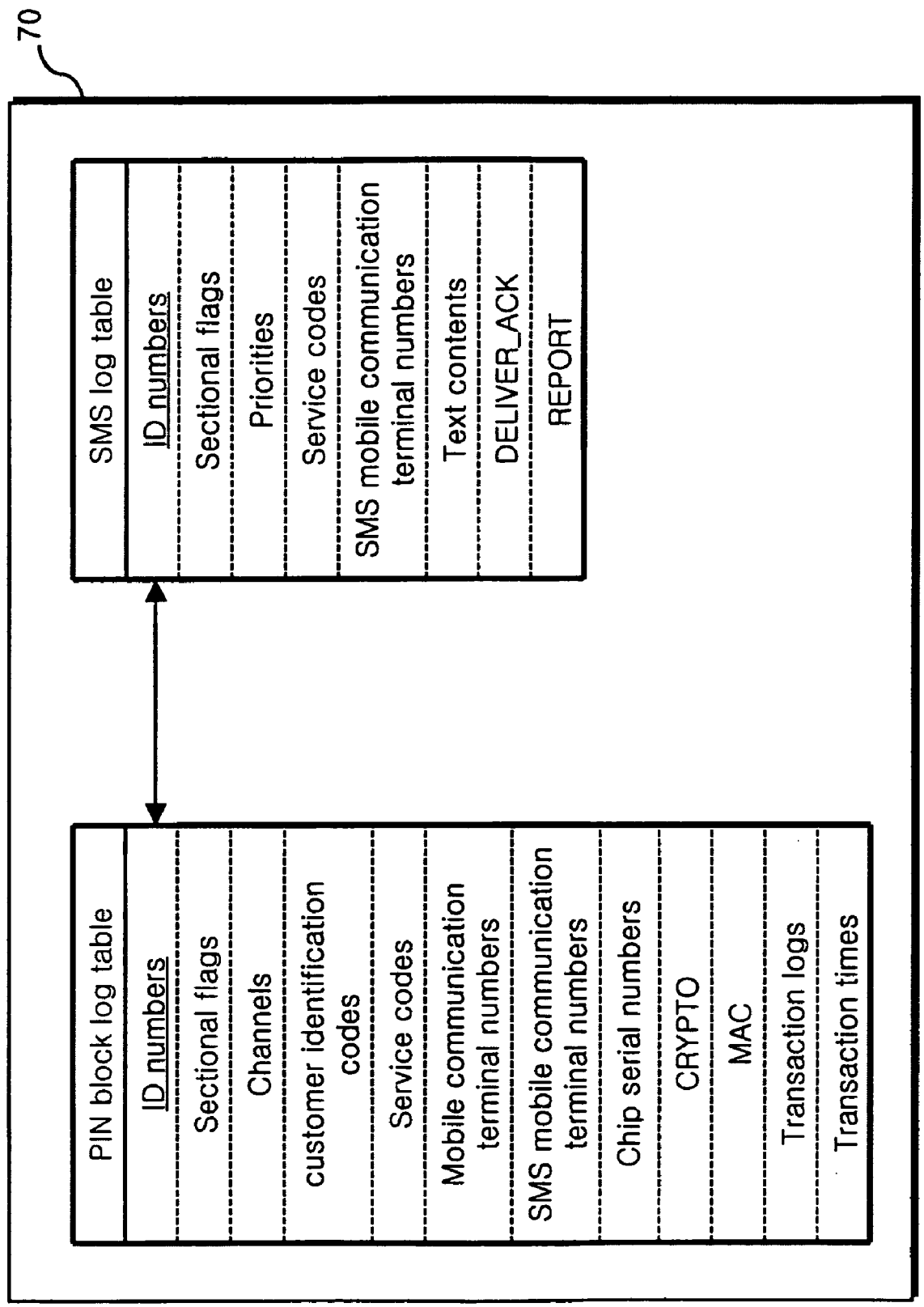
FIG. 4 is a table format diagram of an SMS database in accordance with the present invention.

FIG. 4 is a table format diagram of an SMS database in accordance with the present invention. Like shown in FIG. 2, the SMS database (70) consists of the PIN block log table for storing data extracted from the PIN block telegram received from the relay server (60) and being used to generate the SMS telegram, and the SMS log table for storing the log in accordance with the transmission of the SMS telegram. Primary keys of each table are 'ID numbers' displayed in heavy character and underline.

The PIN block log table includes fields for storing ID numbers, sectional flags, channels, customer identification codes, service codes, mobile communication terminal numbers, SMS mobile communication terminal numbers, chip serial numbers, CRYPTO, MAC, transaction logs, and transaction times, respectively.

First, the ID numbers generated by the first processing module after receiving the PIN block telegram are stored in the ID number field. The ID numbers are code values for identifying PIN blocks for each mobile communication terminal, and become keys, which can refer to necessary data at the SMS log table.

The sectional flags are codes showing process situations of the first communication unit (46) and the first processing module, and the channels are codes for distinguishing the mobile communication company system (20). In addition, the customer identification codes are used to identify customers (banking IDs, etc.), and the service codes are code values for identifying a PIN block service like other mobile banking service. Meanwhile, same values of the mobile communication terminal numbers and the SMS mobile communication terminal numbers are generally stored.

The chip serial numbers (PIN numbers), the CRYPTO and MAC values are hexa values of the PIN block telegram by the first processing module. Values recorded in each field of the hexa values are extracted to be stored. Among the values, the chip serial numbers present an ID value of the smart chip (11) mounted on the mobile communication terminal (10), the CRYPTO value expresses data where a HOST random number is encoded, and the MAC value shows encoded data for guaranteeing integrity of a CRYPTO field value.

Likewise, PIN block telegram transceiving records with the relay server (60) are stored in the transaction log field, and more specifically, a telegram transceiving is displayed through the sectional flag. For instance, when the PIN block telegram is received, the telegram is stored in a sectional flag '0', while being updated into a sectional flag '1' when the telegram is transmitted. Furthermore, a transaction time in accordance with a transceiving of the PIN block telegram is recorded in the transaction time field. In this case, if the PIN block telegram is received, a sectional flag of the transaction log field is set to '0' while recording a receiving transaction time, and if the PIN block telegram is transmitted, the sectional flag is updated into '1' to update the transaction time into a transmission time.

The SMS log table includes each field for ID numbers, sectional flags, priorities, service codes, SMS mobile communication terminal numbers, text contents, DELIVER_ACK and REPORT signals.

First, the ID numbers are the same as the ID numbers of the PIN block log table, being used as a FOREIGN key to refer to necessary data between the PIN block log table and the SMS log table.

In the sectional flag field, a code value showing process steps of the second communication unit (48) and the second processing module is stored. For example, as the code value, '0' showing a reception of the PIN block telegram from the relay server, '1' showing a delivery of the SMS telegram, '2' showing a reception of the DELIVER_ACK signal from the SMS server processor (21), '3' showing a REPORT reception from the SMS server processor, and '4' showing a transmission of the REPORT_ACK signal to the SMS server processor can be used.

In addition, the service code and SMS mobile communication number fields are the same as those of the PIN block log table.

On the other hand, not only are the priority and text contents fields used to generate and transmit the SMS telegram for requesting the PIN block SMS to be transmitted by the SMS log table, but the above fields are used when transmitting a general SMS for an announcement or notice to a customer. That is to say, in the priority field, priorities between transmission requests of the PIN block SMS and other various SMSs (general SMSs) are stored, and it is desirable to give the highest priority to an SMS telegram for PIN block SMS processing. And, with regards to the general SMSs, message contents of an SMS to be shown to the customer are stored in the text contents field. In case of the PIN block SMS, since there is no SMS message to be shown to the customer, the hexa value of the PIN block telegram received from the relay server (60) is stored or a random specific value can be stored, or it is empty in null state.

The DELIVER_ACK field is used to store/update the DELIVER_ACK value received from the SMS server processor (21), verifying that the SMS telegram is transmitted to the mobile communication company system (20) while functioning as an importable reference field to retrieve and extract data for generating the SMS telegram. Finally, the REPORT value received from the SMS server processor (21) is stored in the REPORT field.

Until now, though a system and a method for PIN blocking on a terminal for mobile finance have been concentrically described, the present invention can be applied to overall financial services using mobile systems such as securities or insurance. At this time, it is possible to apply the present invention by replacing/modifying fundamental systems only (business logic processor, Internet banking server, etc.) for providing mobile financial services.

Like mentioned so far, a system and a method for PIN blocking on a terminal for mobile finance in accordance with the present invention can remotely block a smart chip within a mobile communication terminal when a customer lost the terminal for using a mobile financial service, thereby preventing a finder or a third party from obtaining information stored in the smart chip or accessing the mobile financial service by disguising as the owner of the terminal. As a result, it can remarkably increase security for customer information and financial transactions.

Besides, the system and the method for PIN blocking on the terminal for mobile finance in accordance with the present invention can have the following merits:

First, a PIN of a smart chip is cut off from a database within a mobile financial system, while the PIN-blocked smart chip cannot be restorable later, thereby more improving security;

Second, since an SMS is used, the smart chip can be remotely PIN-blocked, as well as the SMS can be used with a general SMS for transmitting an announcement or notice to a customer;

Third, since a telegram is transceived among a relay server, a mobile server (SMS processor), and a mobile communication company system, it is possible to prevent an error for blocking a smart chip of a right mobile communication terminal;

Fourth, since a flag for a process is stored, previous process situations can be easily understood through the flag even though an error or a failure occurs during the process, thereby preventing the previous process from being unnecessarily repeated; and Finally, it is widely applicable to all financial services provided by using mobiles such as securities, insurance, and others as well as mobile banking, without modifying a system configuration on a large scale.

While the present invention has been described in connection with a number of embodiments and implementations, the present invention is not so limited but covers various obvious modifications and equivalent arrangements, which fall within the purview of the appended claims.

What is claimed is:

1. A mobile financial system for PIN-blocking a smart chip by providing a mobile financial service including banking, securities and/or insurance to a customer with the use of a mobile communication terminal where the smart chip is contained, and by transmitting a PIN block SMS for blocking the smart chip through a mobile communication company system to the mobile communication terminal when the mobile communication terminal is lost, comprising:

a first communication unit including a number of the mobile communication terminal and a hexa value, and receiving a PIN block telegram for requesting a PIN block;

a logic processor consisting of a first processing module for parsing the PIN block telegram, generating an identifiable number, and storing the number, the mobile communication terminal number, and the hexa value in a predetermined first storage, and a second processing module for combining the number, the mobile communication terminal number, and the hexa value stored in the first storage, and generating an SMS telegram to request a PIN block SMS to be transmitted; and an SMS processor including a second communication unit for transmitting the generated SMS telegram to a mobile communication company system; and wherein the hexa value includes a chip serial number, the number of the smart chip, and predetermined encoded data.

2. The mobile financial system of claim 1, wherein the mobile financial system further comprises a relay server for transmitting the PIN block telegram to the first communication unit.

3. The mobile financial system of claim 2, wherein the first storage further stores a transceiving log of the PIN block telegram between the relay server and the first communication unit.

4. The mobile financial system of claim 1, wherein the second communication unit receives a first ACK signal transmitted as a response to the SMS telegram from the mobile communication company system, and having an ID value for showing that the SMS telegram is received in the mobile communication company system, and report data having an ID value for showing a result of the PIN block SMS to the mobile communication terminal by the SMS telegram.

5. The mobile financial system of claim 4, wherein the second communication unit transmits a second ACK signal to the mobile communication company system as a response to the report data.

6. The mobile financial system of claim 5, wherein a transceiving between the SMS telegram and the first ACK signal as well as a transceiving between the report data and the second ACK signal is performed through the same port.

7. The mobile financial system of claim 1, wherein the mobile financial system further comprises a second storage transmitting a general SMS to deliver an announcement and notice to the mobile communication terminal through the mobile communication company system, and storing priorities for showing priorities between general SMS transmission and PIN block SMS transmission and a text for showing contents of the general SMS.

8. A method for PIN blocking on a terminal for mobile finance to PIN-block a smart chip by providing a mobile financial service including banking, securities and/or insurance to a customer with a mobile communication terminal where the smart chip is contained, and by transmitting a PIN block SMS for blocking the smart chip to the mobile communication terminal through a mobile communication company system, comprising the steps of:
 a first step of including a number of the mobile communication terminal and a hexa value, and receiving a PIN block telegram for requesting a PIN block of the smart chip;
 a second step of generating a predetermined identifiable number, combining the number, the mobile communication terminal number, and the hexa value, and generating an SMS telegram for requesting a PIN block SMS to be transmitted to the mobile communication terminal; and
 a third step of transmitting the generated SMS telegram to the mobile communication company system; and wherein the hexa value includes a chip serial number, a number of the smart chip, and predetermined encoded data.

9. The method of claim 8, wherein at least prior to the third step, the method further comprises the steps of:
 a fourth step of generating a socket to transceive data with the mobile communication company system;
 a fifth step of transmitting a bind signal for requesting a communication connection to the mobile communication company system; and
 a sixth step of receiving a first ACK signal as a response to the bind signal from the mobile communication company system.

10. The method of claim 8, wherein after the third step, the method further comprises the steps of:
 a 3-1 step of receiving the second ACK signal transmitted as the response to the SMS telegram from the mobile communication company system, and having the ID value for showing that the SMS telegram is received in the mobile communication company system; and
 a 3-2 step of updating the second ACK signal received in the storage where a predetermined initial value for the second ACK signal is stored.

11. The method of claim 10, wherein the storage stores the ID number, the mobile communication terminal number, the hexa value, and the second ACK signal by customer who lost the mobile communication terminal, and the second step further comprises the steps of:
 a 2-1 step of the storage retrieving customer data where the initial value is stored as the second ACK signal; and
 a 2-2 step of loading the retrieved data, combining the ID number, the mobile communication terminal number, and the hexa value, and generating the SMS telegram.

12. The method of claim 8, wherein after the third step, the method further comprises the steps of:
 a 3-3 step of receiving the report data having the ID value for showing a result of the PIN block SMS transmitted to the mobile communication terminal by the SMS telegram from the mobile communication company system;
 a 3-4 step of storing the report data in the predetermined storage; and
 a 3-5 step of transmitting a third ACK signal to the mobile communication company system as a response to the report data.

* * * * *